(12) United States Patent
Patodia (10) Patent No.: US 11,755,776 B2
(45) Date of Patent: Sep. 12, 2023

(54) DETECTING LEAKAGE OF PERSONAL INFORMATION IN COMPUTING CODE CONFIGURATIONS

(71) Applicant: PAYPAL, INC., San Jose, CA (US)

(72) Inventor: Prabin Patodia, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 473 days.

(21) Appl. No.: 17/100,592

(22) Filed: Nov. 20, 2020

(65) Prior Publication Data

US 2022/0164477 A1    May 26, 2022

(51) Int. Cl.
| | |
|---|---|
| *G06F 8/60* | (2018.01) |
| *G06F 8/71* | (2018.01) |
| *G06F 21/62* | (2013.01) |
| *G06F 9/54* | (2006.01) |

(52) U.S. Cl.
CPC ............ *G06F 21/6254* (2013.01); *G06F 8/60* (2013.01); *G06F 8/71* (2013.01); *G06F 9/547* (2013.01)

(58) Field of Classification Search
CPC .......... G06F 21/6254; G06F 8/60; G06F 8/71; G06F 9/547
USPC .......................................................... 726/26
See application file for complete search history.

(56) References Cited

U.S. PATENT DOCUMENTS

| | | | | |
|---|---|---|---|---|
| 9,158,604 | B1 * | 10/2015 | Christodorescu | ....... G06F 9/547 |
| 10,032,043 | B2 * | 7/2018 | Farkash | .............. G06F 21/6245 |
| 11,604,892 | B2 * | 3/2023 | Gutta | ..................... G16H 10/60 |
| 11,630,919 | B1 * | 4/2023 | Tripp | ........................ G06F 8/60 |
| | | | | 713/189 |
| 2011/0202905 | A1 * | 8/2011 | Mahajan | ................... G06F 8/41 |
| | | | | 717/140 |
| 2015/0113659 | A1 * | 4/2015 | D'Costa | .................. G06F 16/25 |
| | | | | 726/26 |
| 2015/0186664 | A1 * | 7/2015 | Nicolaou | .............. G06F 21/554 |
| | | | | 726/30 |
| 2015/0186669 | A1 * | 7/2015 | Nicolaou | ........... G06F 21/6218 |
| | | | | 726/4 |
| 2019/0171846 | A1 * | 6/2019 | Conikee | ................ G06F 21/577 |
| 2019/0392176 | A1 * | 12/2019 | Taron | ....................... G06F 3/167 |
| 2020/0133744 | A1 * | 4/2020 | MacLeod | ................ G06F 9/541 |
| 2021/0200840 | A1 * | 7/2021 | Kannan | ..................... G06F 8/73 |
| 2022/0004655 | A1 * | 1/2022 | Zhang | ................. H04L 63/0471 |

* cited by examiner

*Primary Examiner* — Thanh T Le
(74) *Attorney, Agent, or Firm* — Haynes and Boone, LLP (57) ABSTRACT

There are provided systems and methods for detecting leakage of personal information in computing code configurations. A service provider, such as an electronic transaction processor for digital transactions, may utilize one or more computing systems and architectures to provide services to users. These may utilize applications, decision services, and microservices that invoke different application programming interfaces (APIs). When computing code is provided or changed, use of certain APIs may risk data leakage or misappropriation. Thus, the service provider may utilize an intelligent data processor to determine if these APIs are used in the computing code, and if so, back-trace through the computing code to determine the data objects used in API calls and requests. Thereafter, the service provider may determine whether sensitivity levels of the personal information are impacted by the APIs use of the personal information and may mask data that may be impacted.

20 Claims, 6 Drawing Sheets

```
public void populate TxnInfo(APIRequestObject obj){ —306
ssn = obj.getId(); —304
populateDisputedTxnInfo(ssn ); } public void populateDisputedTxnInfo(Object s_id){
CentralizedApplicationLogging.writeLog( s_id ); } —302
```

APIRequestObject —310

```
{   "type": "object" ,
    "properties": {
        "detail": {
            "type": "string" ,
            "data-Classification": {
                "data-class": "class2" ,
                "data-type": "personal" } } }
```
⎬ 312

```
public void populate TxnInfo(APIRequestObject obj){ —306
id = obj.getDetail(); —308
populateDisputedTxnInfo(id ); } public void populateDisputedTxnInfo(Object s_id){
CentralizedApplicationLogging.writeLog(s_id ); } —302
```

FIG. 3B

Output:

```
public void populateDisputedTxnInfo(Object s_id){
CentralizedApplicationLogging.writeLog(PIIMasker.mask(s_id ) ); }
```
⎬ 314

Before: Disputed txn is for: 123-45-6789 —316

After: Disputed txn is for: \*\*\*_\*\*_\*\*\*\*|—318

DETECTING LEAKAGE OF PERSONAL INFORMATION IN COMPUTING CODE CONFIGURATIONS

TECHNICAL FIELD

The present application generally relates to digital data security and more particularly to preventing digital data from being leaked or compromised from computing code through an online digital platform.

BACKGROUND

Online service providers may provide services to different users, such as individual end users, merchants, companies, and other entities. When providing these services, the service providers may provide an online platform that may be accessible over a network, which may be used to send and receive data. Data may be exchanged between different applications, computing services, and internal/external platforms and computing architectures through application programming interfaces (APIs). For example, calls to a service or server may be effectuated through API requests. These API calls within that service and between API endpoints include data that is shared between different applications and corresponding services.

In some cases, the content may be sensitive or private, such as personally identifiable information (PII), other personal information, funding source information, and the like. This may include names and social security numbers, addresses or other locations, account numbers and balance, and other private user or business data. However, as hackers and other malicious users or entities become more sophisticated, they may perform different computing attacks and other malicious conduct to compromise these API calls and the corresponding data. Thus, service providers require more robust and sophisticated manners of detecting leaked data resulting from computing code and data exchanges through API calls to prevent breach or access by undesired or unintended entities.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for detecting leakage of personal information in computing code configurations. Systems suitable for practicing methods of the present disclosure are also provided.

In digital platforms and network communications, such as between different applications and services for online platforms and systems of service providers, these applications, computing architectures, and communications may face malicious or accidental leakage or revealing of personal information. For example, personally identifiable information (PII), funding source information, and other personal information may be exchanged by different applications and services. In some embodiments, where new computing code is added, such as for a new service, and/or when computing code is updated or changed, the computing code may be analyzed to determine whether any vulnerabilities exist in the computing code, such as if data may be leaked due to the code changes, incidental effects, and/or computing attacks. This allows a malicious or unauthorized party to obtain the data, which may lead to risk and fraud. In additional to computing code changes, computing attacks coming from malicious sources over a network may also compromise vulnerabilities in a computing architecture. A bad actor may initiate a computing attack on the computing environment of the service provider, such as an eavesdropping attack, a password attack and/or account takeover, a web abuse (e.g., account enumeration, brute force attacks, SQL injection), or other type of computing attack that may compromise electronic communications, such as exposing data contained in the electronic communications to the bad actor. This computing attack may introduce risk to private, confidential, or sensitive data of users and/or the service provider, which may lead to fraud and loss.

In order to assist in preventing or minimizing these data leakages, computing attacks, and other abuses that compromise personal information, the service providers, in various embodiment, may utilize an intelligent data processor configured with rules for detecting certain APIs within the computing code. Each data type or data portion for personal information may have a corresponding sensitivity level as assigned by the configurable rules of the intelligent data processor. This intelligent data processor may correspond to a data leakage detector and other data masking operations for a coding framework that determines whether a presence of a designated and configured API is present in the examined computing code.

If present, the intelligent data processor may back-trace through the computing code from the designated API(s) to determine details of the API request object specification in the code, as well as other data that is loaded or computed by the computing service in the back-traced code flow. This information designates the corresponding data and whether that data corresponds to a data type of the personal information. If so, a sensitivity level of that data type is determined and compared to a masking policy that designates whether that sensitivity level is required to be masked (e.g., to prevent leakage from computing code and/or computing attacks) when transmitted via the API, such as through an API call of the corresponding application or service. Thereafter, masking operations may be performed to mask the data type of the personal information when transmitted through or via the API(s) and/or a developer, administrator, or other end user reviewing or analyzing the computing code and such entities may be notified of the masking.

For example, a service provider may provide electronic transaction processing to entities through digital accounts, including consumers and merchants that may wish to process transactions and payments. Other service providers may also provide computing services, including email, social networking, microblogging, media sharing, messaging, business and consumer platforms, etc. In order to establish an account, these different users may be required to provide account details, such as a login, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial or funding source information, including payment card (e.g., credit/debit card) information, bank account information, gift card information, benefits/incentives, and/or financial investments, which may be used to process transactions.

The online payment provider may provide digital wallet services, which may offer financial services to send, store, and receive money, process financial instruments, and/or provide transaction histories, including tokenization of digital wallet data for transaction processing. The application(s) and/or website(s) of the service provider, such as PayPal® or other online payment provider, may provide payments and the other transaction processing services. However, malicious users, entities, and/or other computing devices (e.g., computing devices that may include malware, viruses, and the like that may be hijacked to automate computing attacks) may attempt to abuse or compromise computing systems transmitting sensitive and/or personal data between services and/or computing architectures or devices, such as PII and/or funding source data, when the computing systems and code may be compromised or have data leaks.

A service provider may receive computing code for deployment, such as in a live production computing environment. This may correspond to existing computing code in the production computing environment for analysis, new computing code to be deployed, and/or code changes to the existing code. The computing code may require, exchange, and/or transmit some sensitive, confidential, and/or private information, such as PII, via one or more APIs and corresponding API calls. In order to determine whether there may be data leakages or APIs that may be compromised from computing attacks (e.g., external APIs or ones on high-risk platforms), the intelligent data processor for the data leakage detector may first receive data classification rules, for example, from a data classification manager. These data classification rules may correspond to one or more sensitivity levels for different data types or portions of personal information.

For example, a data type of personal information may correspond to a name, a social security number, an address, an age or date of birth, a payment card, a bank account, a credit score, or a tax document. This may also correspond to other types of PII or financial information, including subcategories of information within a broader category (e.g., a bank account balance, a recent transaction, a merchant name or classification number in a transaction, and the like). The sensitivity levels may correspond to individual classifications or secrecy levels requiring higher degrees of protection or security of the underlying data. For example, a social security number may be a highest sensitivity level, while a date of birth may be a lower (e.g., second highest or lower) sensitivity level. The data classification rules may be stored and updated in a data classification repository accessible by the intelligent data processor.

The rules and settings for the intelligent data processor may further include defined logging APIs and designations of particular APIs that are to be identified in computing code as transmitting personal information via one or more API calls. A configuration manager or other end user, administer, or the like, may designate one or more APIs that are to be detected or identified in computing code in order to backtrace to determine if those APIs transmit one or more data types of personal information. These may include identification of APIs in and/or used by applications, decision services, and microservices that may be prone or at risk of data leakage, such as external APIs, APIs that communicate with external APIs, and/or those at risk of computing attacks. For example, a service may output data, including personal information, via different mediums where the data is included with an API call to another application or service, such as by performing an API call, performing an API response to a call, logging data, or otherwise emitting an event or publishing data. This therefore designates specific APIs that should not transmit one or more data types of personal information. These designations may further be stored to one or more repositories accessible to the intelligent data processor.

A masking policy may also be defined, such as by the configuration manager or another entity and stored to an available data repository. The masking policy may designate which sensitivity levels for the different data types of the personal information are to be masked when transmitted through certain ones of the APIs. For example, when transmitted through API A, only the highest sensitivity level of personal information may be masked, however, through another API B, the top two or three sensitivity levels may be designated for masking. The policy may also or instead be designated by application or service. For example, with a service A, only the highest sensitivity level of personal information may be masked, however, through another service B, the top two or three sensitivity levels may be designated for masking. Further, the masking policy may designate how the data types for the sensitivity levels are masked, such as the point that the data is retrieved, sent via an API, or the like, as well as if the data is masked at all. If the data is not masked or as an additional policy setting, the masking policy may also establish how a code developer, administrator, end user, or the like is notified of the masked data or requirement to mask the data (e.g., when the sensitivity level of the personal information is transmitted by a restricted API). This may include identifying the APIs transmitting and computing code that causes the transmittal of the personal information that is restricted or masked.

Once established, the computing code for analysis may be accessed or received. For example, a code developer may utilize one or more software development kits (SDKs) that provide tools and functionalities to submit and/or update computing code that may be deployed to a live production computing environment. The SDK(s) may include processes to generate and submit code for analysis by the intelligent data processor, including user interfaces to provide code and review, analyze, change, and/or deploy the code. In this regard, the computing code may be stored by a code repository for analysis and/or deployment. Thereafter, the intelligent data processor may analyze the computing code to identify the presence of any of the APIs from the API designations. If present, from each API that is identified, the intelligent data processor then back-traces through the computing code (e.g., by starting at the identified API and reversing flow through the code of the data objects) to find how the API is called by other services. This allows for determination of details of the data objects used by the API from their API request objects.

Thereafter, the classification rules are invoked to determine whether the data type and corresponding data object corresponds to one of the sensitivity levels (for data types of personal information) that is barred or restricted from transmission by that API. For example, the sensitivity levels may be used with the masking policy to determine if the policy requires masking of the corresponding sensitivity level when transmitted via the identified API. If not, then no action may be taken. However, if so, the masking policy may require that the data type of the personal information is to be masked, which may occur prior to use by the API or when transmitted via the API through one or more API calls. Masking of the data may include replacing the data with other symbols, blank portions, or the like that makes the data undiscoverable. Further, the related developers, administrators, or the like may be notified of the API in the computing code, the masked data, and/or the data type used by the API in order to take actions to change their code or made aware of the code masking.

Figure 1:
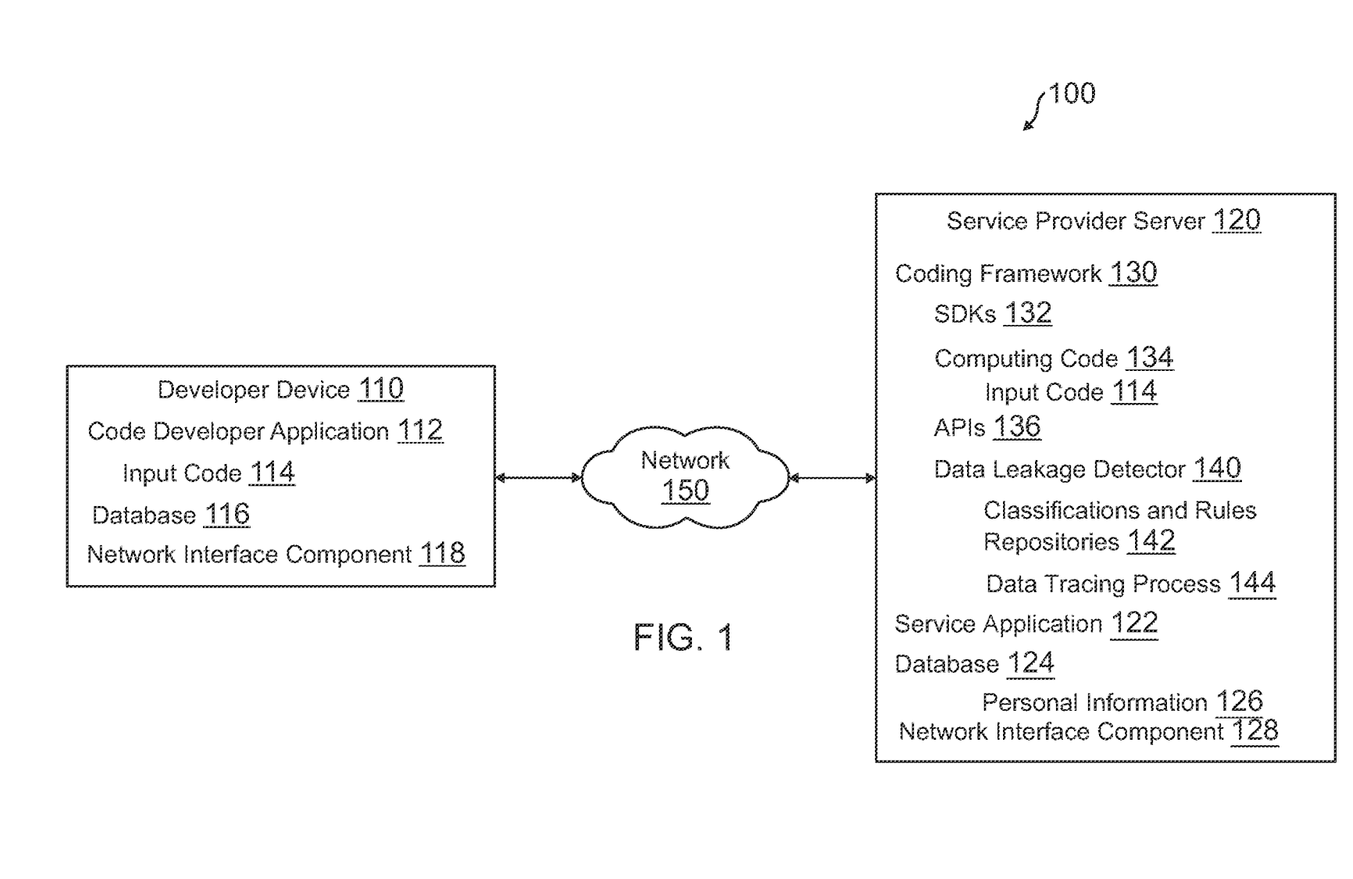
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a developer device 110 and a service provider server 120 in communication over a network 150. Developer device 110 may be utilized by a user to receive communications over network 150, where service provider server 120 may provide various data, operations, and other functions over network 150 to analyze computing code to detect potential leaks or misappropriation of personal information. In this regard, developer device 110 may provide computing code to service provider server 120, which may then determine if designated APIs are used for transmission of different data types of personal information.

Developer device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Developer device 110 may be implemented as a communication device that may utilize appropriate hardware and software configured for wired and/or wireless communication with service provider server 120. For example, in one embodiment, developer device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Developer device 110 of FIG. 1 contains a code developer application 112, a database 116, and a network interface component 118. Code developer application 112 may correspond to executable processes, procedures, and/or applications with associated hardware. In other embodiments, developer device 110 may include additional or different modules having specialized hardware and/or software as required.

Code developer application 112 may correspond to one or more processes to execute software modules and associated components of developer device 110 to provide features, services, and other operations for a user over network 150, which may include writing, authoring, and otherwise developer computing code executable by service provider server 120, for example, through one or more applications, decision services, and/or microservices of service provider server 120. In this regard, code developer application 112 may correspond to specialized software utilized by a user of developer device 110 (e.g., a code developer, tester, administrator, or the like) that may be used to access a website or UI that may be used for generating input code 114 for use with the computing services of service provider server 120. In various embodiments, code developer application 112 may correspond to a general browser application configured to retrieve, present, and communicate information over the Internet (e.g., utilize resources on the World Wide Web) or a private network. For example, code developer application 112 may provide a web browser, which may send and receive information over network 150, including retrieving website information (e.g., a website for an email provider or other messaging service), presenting the website information to the user, and/or communicating information to the website. This website information may include web applications and the like that may be accessible to utilize one or more SDKs in order to generate input code 114. However, in other embodiments, code developer application 112 may include a dedicated application of service provider server 120 or other entity (e.g., an email provider or messaging service). In such embodiments, code developer application 112 may be associated with and/or provide one or more SDKs, which may be used for generation of input code 114. Further, code developer application 112 may request deployment of computing code to live production computing environments.

When using code developer application 112 to generate, test, and/or deploy input code 114 with one or more services of service provider server 120, code developer application 112 may request testing and/or analysis of input code 114 to detecting any vulnerabilities, such as potential leakage of PII, financial data, or other personal data from one or more APIs and/or corresponding API calls between different APIs in applications, decision services, and/or microservices. If any restrictions, alerts, or notifications are generated based on the used APIs, personal information used in API calls, and/or corresponding policies to mask data, code developer application 112 may be used to see the corresponding APIs used in input code 114 that are flagged for review. Code developer application 112 may display those APIs and personal information (including data types of that personal information) with the corresponding code from input code 114 so that a user, developer, or the like utilizing developer device 110 may review input code 114 and perform any revisions or changes to avoid the potential leakage or misappropriation of personal information. Further, code developer application 112 may be used to review masked data types of personal information when performed by service provider server 120 (e.g., based on data classification rules, designations of APIs and services, and one or more policies for masking data), which may display what the masked data was, as well as the output masked data when masked prior to use with an API and corresponding API calls.

Developer device 110 may further include a database 116 stored on a transitory and/or non-transitory memory of developer device 110, which may store various applications and data and be utilized during execution of various modules of developer device 110. Database 116 may include, for example, identifiers such as operating system registry entries, cookies associated with code developer application 112 and/or other applications, identifiers associated with hardware of developer device 110, or other appropriate identifiers, such as identifiers used for payment/user/device authentication or identification, which may be communicated as identifying the user/developer device 110 to service provider server 120. Moreover, database 116 may store input code 114, SDKs used to generate computing code including input code 114, and/or other data used when analyzing input code 114 for vulnerabilities and/or data leakages.

Developer device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide services to users, as well as computing code frameworks to write, develop, test, and deploy computing code to one or more live production computing environments. In this regard, service provider server 120 includes one or more processing applications which may be configured to interact with developer device 110 to transmit an electronic communication to developer device 110, which may be used to display data within the pixel arrangements. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a coding framework 130, a service application 122, a database 124, and a network interface component 128. Coding framework 130 and service application 122 may correspond to executable processes, procedures, and/or applications with associated hardware. In other embodiments, service provider server 120 may include additional or different modules having specialized hardware and/or software as required.

Coding framework 130 may correspond to one or more processes to execute modules and associated specialized hardware of service provider server 120 to provide a framework including applications, SDKs, and the like to write, develop, test, and deploy computing code to one or more live production computing environments, including testing and analyzing new or updated code for vulnerabilities and/or leakage of personal information through APIs. In this regard, coding framework 130 may correspond to specialized hardware and/or software used by service provider server 120 to first receive computing code, which may correspond to new code for deployment, updates to previous code, and/or currently deployed and live code for analysis. For example, SDKs 132 of coding framework 130 may be used to provide, update, and/or analyze computing code 134 for one or more applications, decision services, and/or microservices of service provider server 120. Computing code 134 may further include input code 114 from developer device 110, which may correspond to the code for analysis. Computing code 134 may utilize one or more of APIs 136 in order to interface between different applications, processes, and services, for example, in order to exchange data that may include personal information required to be masked and/or identified when transmitted using API calls by APIs 136.

Thereafter, a data leakage detector 140 may be used to determine whether designated ones of APIs 136 transmit personal information and the particular data types of the personal information and mask the personal information based on classifications and rules repositories 142. For example, classifications and rules repositories 142 may be used in order to determine data classifications for the data types of personal information. This may include sensitivity levels of different types of personal information, where each type may correspond to a category (e.g., addresses or locations, identifying information, financial information, etc.) of personal information or a specific portion of personal information (e.g., a social security number, date of birth, name, etc.). The sensitivity levels further designate an importance to maintain the personal information as masked or hidden. Data leakage detector 140 may utilize designations of APIs to detect and analyze use of in computing code 134 (e.g., vulnerable APIs or APIs that may cause data leakage) with a masking policy and/or service policy. This policy defines what sensitivity level of personal information is required to be masked by individual APIs and/or use of those APIs with a particular application, decision service, or microservice.

Thereafter, data leakage detector 140 may utilize classifications and rules repositories 142 to perform a data tracing process 144. For example, data leakage detector 140 may examine for the presence and/or appearance of designated ones of APIs 136 in input code 114. If detected, data tracing process 144 traces backwards from the present of one of APIs 136 to determine the data objects and API request object used by the API. If the presence of personal information is found in the objects, then data leakage detector 140 may compare a sensitivity level of the type of the personal information present in the objects to the masking and/or service policy. If the policy determines that such personal information is to be masked when used by the API and/or service, the particular type of personal information may be masked. Further, the policy may cause data leakage detector 140 to provide a notification and/or alert to a code developer or the like, such as via developer device 110, that identifies the used API, the relevant code sections and/or masked data, and the resulting code with the masked data type for the personal information (e.g., a hidden social security number).

Service application 122 may correspond to one or more processes to execute modules and associated specialized hardware of service provider server 120 to perform a service to end users of service provider server 120, which may include services developed using coding framework 130 with developer device 110. In this regard, service application 122 may correspond to specialized hardware and/or software used by a user associated with developer device 110 to perform one or more services. Service application 122 may correspond to electronic transaction processing, messaging, social networking, media posting or sharing, microblogging, data browsing and searching, online shopping, and other services available through service provider server 120. Service application 122 may be used by a user to establish a payment account and/or digital wallet, which may be used to generate and provide user data for the user, as well as view communications from coding framework 130. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account and provide payments through the payment account. This data used and maintained by the operations of service application 122 may correspond to personal data of one or more users, which is additional secured from leakage or misappropriation by data leakage detector 140. The payment account may be accessed and/or used through a browser application and/or dedicated payment application. All of these services of service application 122, including applications, decision services, microservices, and the like may be coded, deployed, and hosted in a live production computing environment through use of coding framework 130 to generate and maintain such services.

Additionally, service provider server 120 includes database 124. Database 124 may store various identifiers associated with developer device 110. Database 124 may also store account data, including payment instruments and authentication credentials, as well as transaction processing histories and data for processed transactions. Database 124 may store financial information or other data generated and stored by other applications. Database 124 may also include computing code 134 and other data necessary to provide and maintain services to users by service provider server 120, including personal information 126 used by service application 122. In this regard, database 124 may be used to store new, updates, and existing code analyzed by data leakage detector 140 of coding framework 130 to prevent leakage or misappropriation of personal information 126.

In various embodiments, service provider server 120 includes at least one network interface component 128 adapted to communicate developer device 110 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
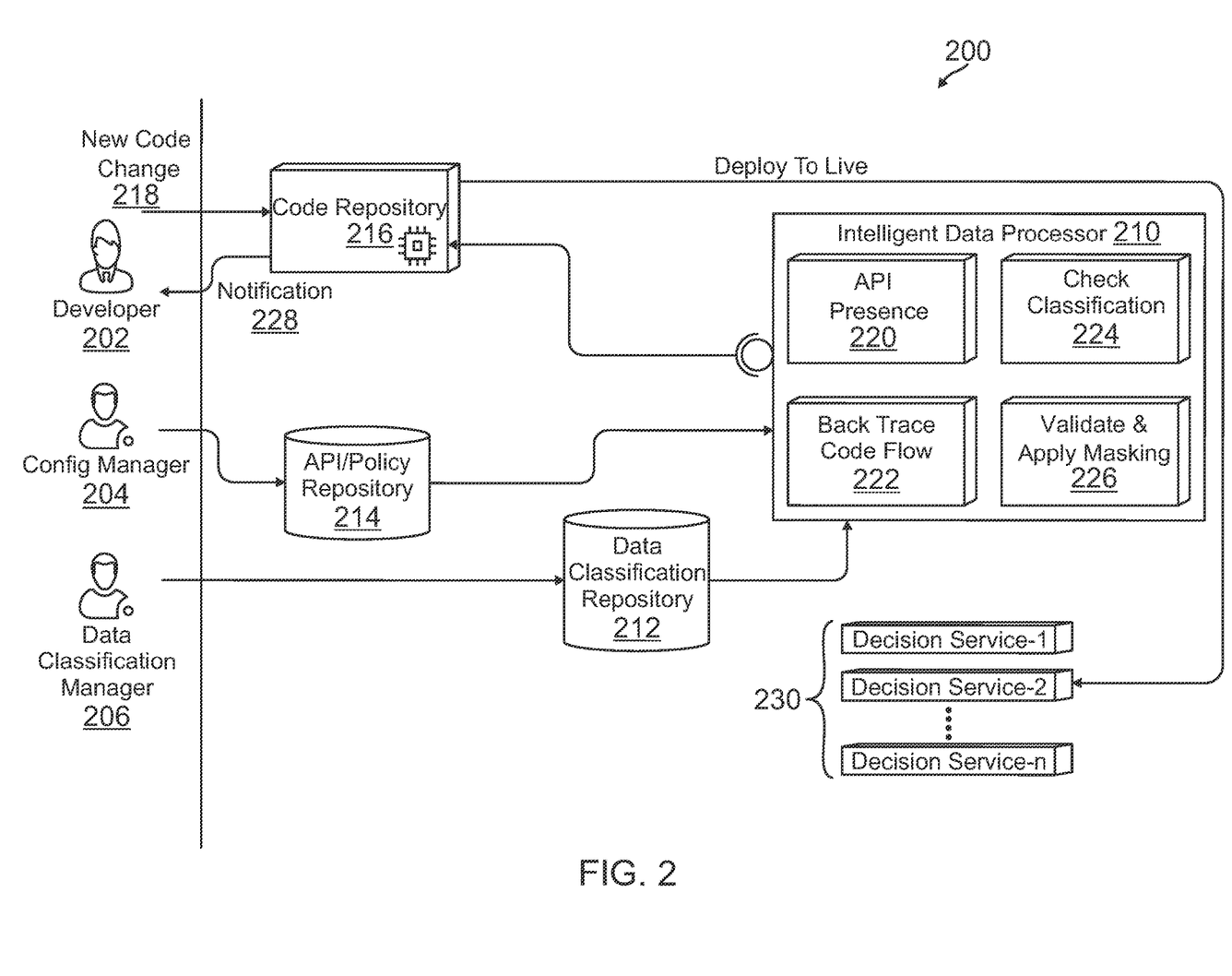
FIG. 2 is an exemplary block diagram of a computing architecture to detect and/or mask leakage of personal information when transmitted through APIs of a service provider system, according to an embodiment.

FIG. 2 is an exemplary block diagram 200 of a computing architecture to detect and/or mask leakage of personal information when transmitted through APIs of a service provider system, according to an embodiment. Diagram 200 of FIG. 2 displays an exemplary architecture of a system that may be utilized in order to analyze new or existing code, including code updates, to detect if certain APIs transmit personal information that may be vulnerable to computing attacks, misappropriation, and/or leakage to unauthorized parties. In this regard, diagram 200 includes a developer 202, a configuration manager 204, and a data classification manager 206 that interact with an intelligent data processor to perform analysis of computing code for data leakages.

In order to configure intelligent data processor 210 to detect potential leakages of personal information in computing code and mask that personal information, configuration manager 204 and data classification manager 206 may first provide classifications, designations, policies, rules, and other data configurations to allow for intelligent data processor 210 to back-trace through computing code to detect use of personal information by designated APIs. Data classification manager 206 may initially provide and/or update data classification rules in a data classification repository 212. These rules may therefore classify types and/or portions of data included in personal information by sensitivity levels or other classifications, such as a level 1, 2, 3, etc., or a highest sensitivity level, medium sensitivity level, etc. Personal information may correspond to PII, as well as other sensitive data including financial data and the like. Thus, different data types of personal information may correspond to categories, subcategories, or specific types/portions including a name, a social security number, an address, an age or date of birth, a payment card, a bank account, a credit score, a tax document, a bank account balance, a recent transaction, a merchant name or classification number in a transaction, and/or the like. Each of these may correspond to a separate and/or shared sensitivity level, which are stored by data classification repository 212.

Configuration manager 204 may provide additional rules, designations, and policies for APIs and required masking of personal information and the corresponding sensitivity levels when utilized by computing code, which may be stored by an API/policy repository 214. In this regard, configuration manager 204 may provide designations of particular APIs that utilize personal information, such as to output the personal information through particular mediums, resources, and/or services. In this regard, an API of an application, decision service, and/or microservice may perform certain API calls that perform particular operations, such as to output the personal information to another API, log the personal data in a database, cache, or other permanent or semi-permanent storage, publish or emit the data, or otherwise utilize the data in an API call that may be leaked or compromised. Thus, the designations may determine which APIs that the personal information should not be transmitted through and/or utilize by the API in one or more calls, requests, or responses. These designations of APIs may then be stored by API/policy repository 214.

With the designations of the APIs, configuration manager 204 may further provide a policy for masking personal information and/or notifying developer 202 or another user of the use of the personal information by the designated APIs, which is stored by API/policy repository 214. The policy may designate which APIs and/or services cause auto-masking and/or alerting of what sensitivity levels of personal information. For example, a policy may designate that a service A is to auto-mask types of personal information and alert developer 202 of use of the types of personal information that fall into a highest sensitivity level, only alert and not auto-mask a second highest sensitivity level, and perform neither alerting nor auto-masking of a lowest or third highest sensitivity level. A service B may be defined under the policy to auto-mask and alert under the two highest sensitivity levels, while performing neither with the lowest nor third highest sensitivity level; however, other policy configurations may be used for service A and service B. Instead of the policy being service dependent for masking and alerting/notifying, particular APIs may instead or also be used with the policy, such that the above service A and service B may correspond to an API A and an API B. In some embodiments, no masking or alerting may be used, or only one of masking and alerting may be used. Once the policy is determined, it may further be stored to API/policy repository.

Developer 202 may then utilize one or more SDKs or other code developer applications and operations to provide new and/or updated code to code repository 216 for analysis and further deployment to a live production computing environment. In this regard, developer 202 may provide a new code change 218 to code repository 216 that uploads or provides new code (e.g., for entirely new code) and/or updates to existing code. In further embodiments, existing code may also be analyzed without changes, for example, to detect leakages in existing systems. Thereafter, new code change 218 is processed by intelligent data processor 210 to detect for any potential leakages of personal information caused by particular APIs when emitting some event via an API call. In this regard, intelligent data processor 210 first performs an API presence operation 220 to detect presence of an API configuration within the computing code for new code change 218. Intelligent data processor 210 may access new code change 218 from code repository 216 and scan through the code to detect any lines of code that include a log or other statement invoking one of the designated APIs for use. This may utilize designations stored by API/policy repository 214.

If one or more of the designated APIs are detected as being used within the computing code (e.g., to perform an API call to emit some event that may include personal information), intelligent data processor 210 then performs a back-trace code flow operation 222 in order to trace backwards from the use of each of the designated APIs to a corresponding starting point for an API request object. The API request object may the last point for the search and back tracing, and thus any additional data loaded or computed in the back-traced code may be analyzed for sensitivity. This loaded or computed data within the back-traced code may therefore include personal information required to be masked. For example, code execution in the service may start with an API call with the corresponding data object, and thus the API request object may be determined by the back-trace code flow operation 222. Thereafter, a check classification operation 224 may be used to determine a classification of a sensitivity level for the corresponding personal information of the API request object and loaded/computed data within the back-traced code, such as the particular data type or portion of personal information being used and transmitted. Check classification operation 224 may utilize those data classification rules as stored by data classification repository 212.

Intelligent data processor 210 may then determine whether masking of the personal information and/or notifying of developer 202 may be required. In this regard, a validate and apply masking operation 226 may be performed to first validate with the corresponding policy from API/policy repository 214 for the sensitivity level of the personal information corresponding to the API request object. For example, validate and apply masking operation 226 may determine whether the sensitivity level being used by the detected API and/or service requires masking, as well as notifying of developer 202 of the masking and code sections. If so, masking may be applied to hide the personal information when emitted by the API in one or more API calls, such as by replacing the personal information with hidden or masked sections that do not reveal the personal information or otherwise preventing the personal information from being emitted.

Thereafter, a notification 228 may be provided to developer 202. The notification may display or mark the corresponding code section having the log or other statement utilising the identified API, as well as any API request object for corresponding data objects of personal information. The notification may also allow developer 202 to unmask the masked personal information, as well as change the corresponding code sections if desired to change the used APIs, data objects, and/or computing code. For example, in some embodiments, the personal information may not be masked or may be requested to be revealed by developer 202, such as if the personal information may be needed by a downstream operation or service. Once developer 202 is satisfied with the code, developer 202 may request that the computing code is deployed from code repository 216 to a live production computing environment, such as those provided by decision services 230. Thereafter, the computing code may be used in decision services 230 to provide end users of a service provider with computing services including electronic transaction processing services.

Figure 3A:
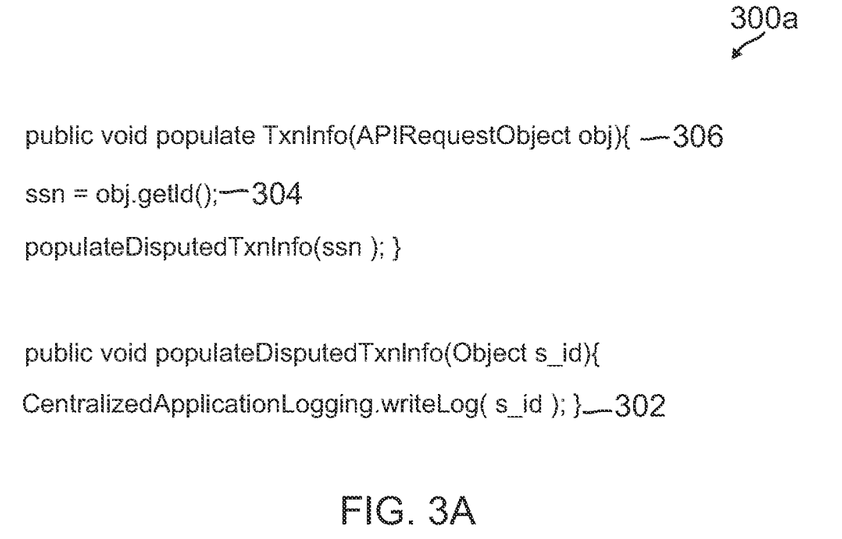
FIGS. 3A-3C are exemplary computing code that cause transmission of personal information that may be compromised or leaked, according to an embodiment.
Figure 3B:
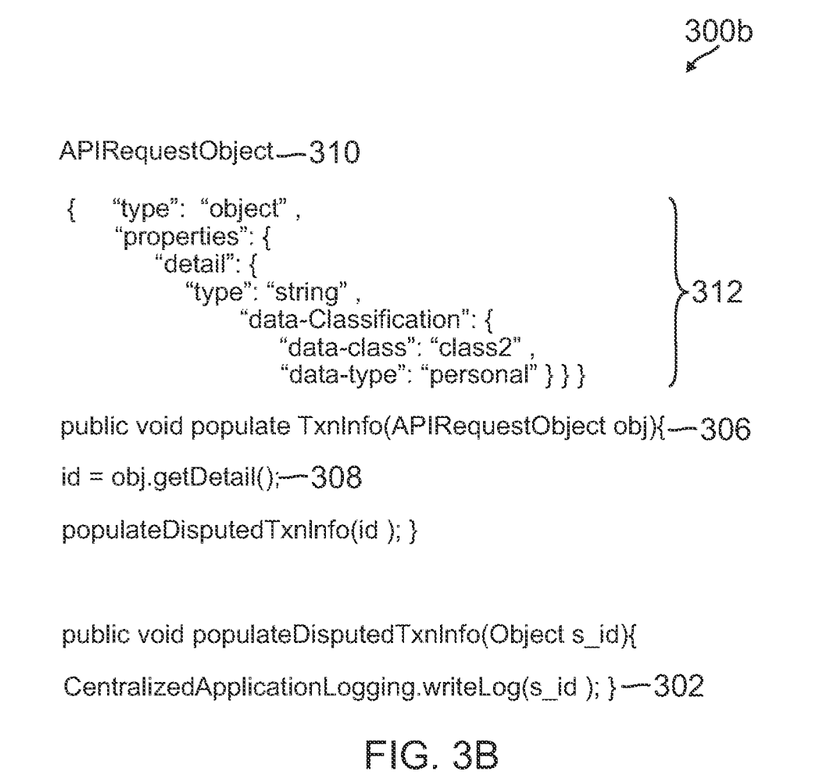
Figure 3C:
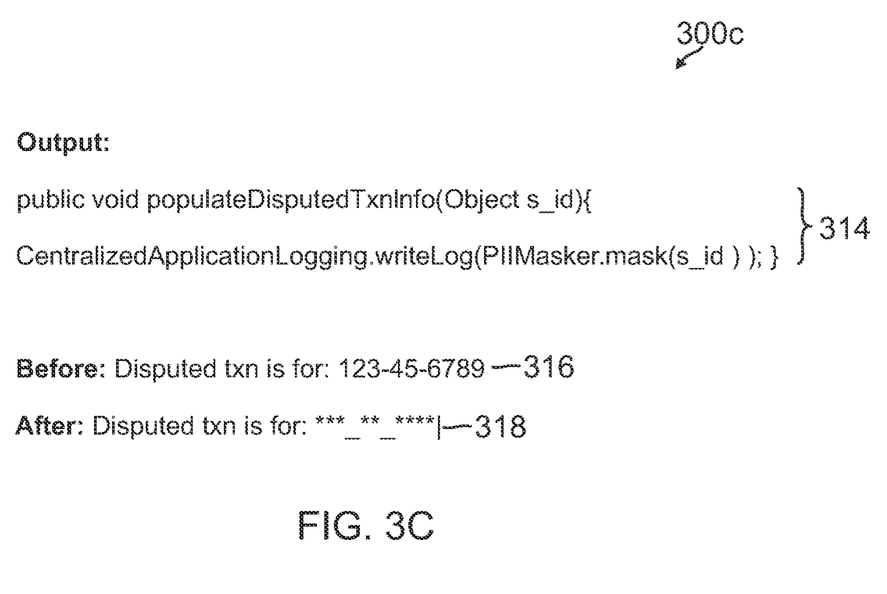

FIGS. 3A-3C are exemplary computing code 300a-300c that cause transmission of personal information that may be compromised or leaked, according to an embodiment. Computing code 300a of FIG. 3A includes code that may be generated by a developer or other end user using developer device 110 and service provider server 120 discussed in reference to system 100 of FIG. 1. In this regard, computing code 300a shows exemplary lines of code, which may include a log or other statement having an API designated for identification when the API appears in code (e.g., is invoked in the code to perform some process with the code, such as emit an event or API call that transmits and utilizes personal data). In this regard, a log statement 302 is shown for an API that performs data logging. Log statement 302 may therefore be associated with a particular API that is designated to not send through certain personal information in calls and requests.

In order to back-trace through computing code 300a to identify an API call 306, an intelligent data processor may utilize the lines of code and coding operations to look at previous code to identify personal information 304 and API call 306 corresponding to personal information 304 (e.g., the originating API call of personal information 304). As shown in computing code 300a, personal information may be identified with API call 306 so that a sensitivity level of personal information 304 may be determined. Personal information 304 may correspond to a social security number, which may require a highest level of secrecy and therefore sensitivity. This personal information may correspond to API call 306 and therefore be the corresponding personal information that is transmitted through the API corresponding to log statement 302. Thus, based on the sensitivity level for personal information 304 and the masking policy, personal information 304 may later be masked, as discussed further in reference to FIGS. 3B and 3C.

Computing code 300b of FIG. 3B includes code that may be generated by a developer or other end user using developer device 110 and service provider server 120 discussed in reference to system 100 of FIG. 1. In this regard, computing code 300b shows exemplary lines of code, which may include a log or other statement having an API designated for identification when the API appears in code (e.g., is invoked in the code to perform some process with the code, such as emit an event or API call that transmits and utilizes personal data). In this regard, log statement 302 is further shown for another exemplary API call that performs data logging. As with computing code 300a, log statement 302 may therefore be associated with a particular API that is designated to not send through certain personal information in calls and requests.

When back-tracing through computing code 300b to identify an API request object, in FIG. 3B, another example of API call 306 is shown. As an intelligent data processor back-traces through computing code 300b, personal information 308 may be identified that corresponds to API call 306 in computing code 300b, which originates the use of personal information 308 in computing code 300b. When analyzing the originating API request object having the data object for personal information 308, an API request object 310 is shown in computing code 300b. As shown in FIG. 3B, API request object 310 includes parameters 312 that allow for identification of a data classification, such as a sensitivity level. In parameters 312, a sensitivity level or data class is shown as a class 2 for a data type of personal information.

Computing code 300c of FIG. 3C includes code that may be generated by a developer or other end user using developer device 110 and service provider server 120 discussed in reference to system 100 of FIG. 1. In this regard, computing code 300c shows masked personal data as would be displayed when code is masked. Further, computing code 300c shows a masked log statement 314 that includes a data masking identification for the personal information transmitted through the API corresponding to masked log statement 314. For example, when a masking policy implements a masking operation to mask personal data when transmitted through an API, the corresponding code using that API within computing code 300c may reflect what personal data was masked when transmitted via that API. Thus, in computing code 300c, masked log statement 314 shows a "PIIMasker.mask" for the personal information 304 or 308 from FIG. 3A or 3B. Thus, a developer may view what computing code is being affected by the masking operation and what the code changes are based on the masking. Further, unmasked personal information 316 is shown as the previously unmasked version of the personal information as transmitted via the API, which masked personal information 318 is shown with the now masked version. As can be seen, masked personal information 318 prevents leakage of the sensitive data in unmasked personal information 316.

Figure 4:
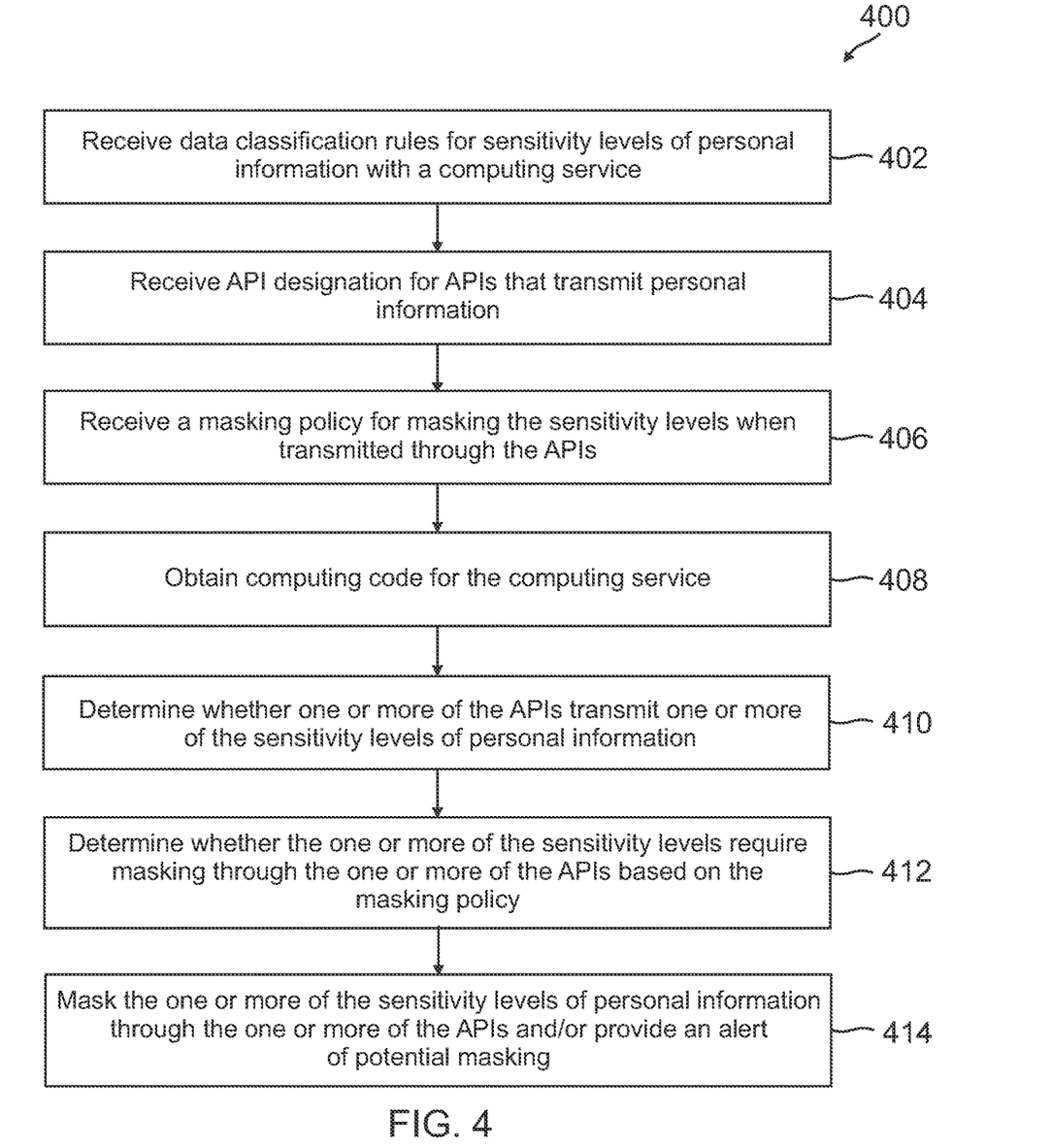
FIG. 4 is a flowchart for detecting leakage of personal information in computing code configurations, according to an embodiment.

FIG. 4 is a flowchart 400 for detecting leakage of personal information in computing code configurations, according to an embodiment. Note that one or more steps, processes, and methods described herein of flowchart 400 may be omitted, performed in a different sequence, or combined as desired or appropriate.

At step 402 of flowchart 400, data classification rules for sensitivity levels of personal information with a computing service are received or accessed. These data classification rules define different levels of sensitivity or required secrecy of personal information, such as PII, financial data, and similar personal information for users, merchants, and other entities. The data classification rules may particularly designate each type and/or categories of personal information for secrecy, such as single portions or grouping of personal information and their required sensitivity when utilized with the computing service and/or other services of a service provider. These rules may be set by the system and maybe based on designations from the user, e.g., if a user or entity is more sensitive about certain types of data or personal information than other types, which may vary depending on the individual or the entity.

API designations for APIs that exchange or transmit the personal information are received, at step 404. For example, certain APIs used by services may be designated as those that are to be monitored or identified in computing code. These APIs may be those that exchange or utilize personal information, such as by emitting events including personal information. These events may include different outputs of personal information through different services, APIs, and mediums, including logging data, providing an API response, publishing data, and the like. The APIs may be designated as potentially vulnerable or that should not be used for transmission of personal information due to potential leakage of the personal information.

At step 406, a masking policy for masking the sensitivity levels when transmitted through the APIs is received. This masking policy may designate what the sensitivity levels that require masking and/or alerting of a code developer of the like when transmitted through the designated APIs. For example, when a particular API and/or corresponding service for the API transmits a particular data type and corresponding sensitivity level of personal information, the masking policy may require that particular type of personal information to be masked. Further, the masking policy may identify how and who to alert when such a transmission occurs.

At step 408, computing code for the computing service is obtained. The computing code may correspond to new, existing, and/or updated computing code for the computing service, which may be used to perform one or more executable processes with an application, decision service, and/or microservice of the corresponding service provider. The computing code may be stored to a code repository for analysis by a coding framework and corresponding intelligent data processor. Thereafter, it is determined whether one or more of the APIs transmit personal information having one or more of the sensitivity levels, at step 410. This may be done by analyzing the code for statements that utilize the API, such as where identification and invocation of the API occur in the computing code.

At step 412, it is determined whether the one or more of the sensitivity levels require masking through the one or more of the APIs based on the masking policy. For example, the intelligent data processor may back-trace through the computing code in order to determine loaded and/or computed data in the computing code to an origin point for an API call having an API request object. The intelligent data processor may examine the loaded data, computed data, and API request object to determine if any personal information exists in such code and data. Thereafter, the API request object and loaded/computed data are analyzed to determine a sensitivity level of the corresponding personal information. This may be compared to the masking policy to determine if the personal information having that sensitivity level requires masking when transmitted through the particular API and/or service. If no masking is required, no further action may be taken, such as if the sensitivity level of personal information is not to be masked for that particular API and/or service.

If masking is required, at step 414, the personal information having the one or more of the sensitivity levels is masked through the one or more of the APIs and/or an alert is provided of the potential masking. The masking may be performed so that when the personal information is used by and/or transmitted through the identified and flagged API, the personal information is masked an unreadable by an unauthorized entity, the developer, the API, and/or the like. Further, a developer or other user may be notified of the masking and the particular code sections in order to provide changes to the code if desired. Where the personal information should not be masked, the developer may request unmasking, such as if a downstream API or service requires use of the unmasked personal information.

Figure 5:
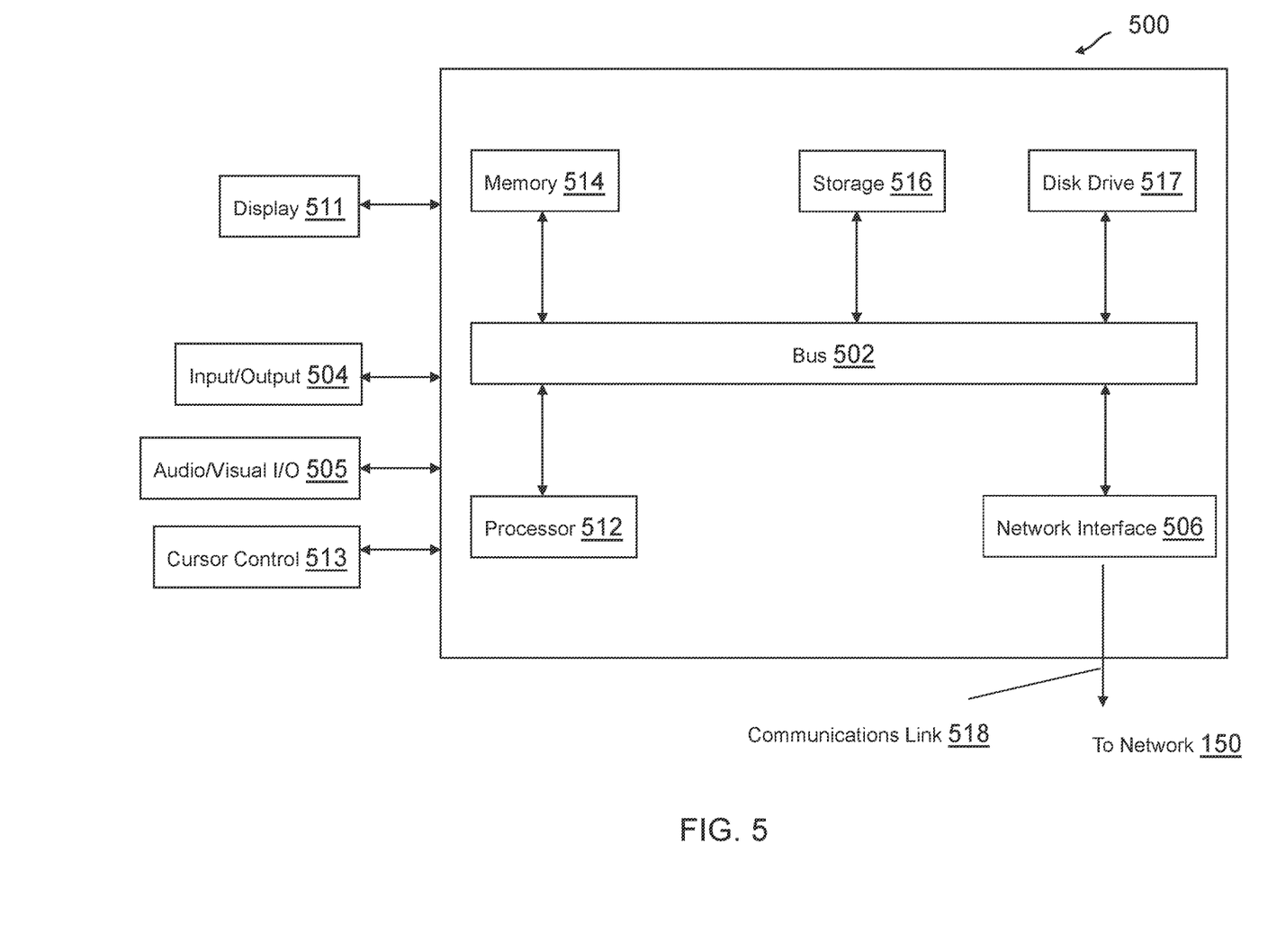
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving computing code generated by a user device for a computing service of a service provider, wherein the computing code utilizes one or more application programming interfaces (APIs) of the service provider;
accessing data classification rules of the service provider that classify a plurality of data types by one or more sensitivity levels, wherein the one or more sensitivity levels indicate whether the plurality of data types are to be masked when sent through the one or more APIs;
determining that the computing code causes a first data type of the plurality of data types to be transmitted via a first API of the one or more APIs;
determining that first data having the first data type is to be masked when sent through the first API based on the data classification rules; and
providing a notification to the user device that the computing code causes the first data to be transmitted via the first API.

2. The system of claim 1, wherein the operations further comprise:
accessing a masking policy for masking the first data when sent through the first API; and
masking the first data when transmitted through the first API.

3. The system of claim 2, wherein the operations further comprise:
providing masked data for the first data type with the computing code to the user device via a user interface.

4. The system of claim 1, wherein the notification identifies the first data type for masking based on the data classification rules and a sensitivity level of the one or more sensitivity levels for the first data type.

5. The system of claim 1, wherein the computing code comprises one of a new software deployment to the computing service or an update to the computing service.

6. The system of claim 1, wherein the computing code is generated using one or more software development kits (SDKs) provided by the system to the user device for a use with the computing service.

7. The system of claim 1, wherein the operations further comprise:
determining that the computing code causes second data having a second data type of the plurality of data types to be transmitted via a second API of the one or more APIs; and
determining that the second data is to be masked when sent through the second API based on the data classification rules.

8. The system of claim 7, wherein the determining that the second data is to be masked is further based on whether a sensitivity level of the second data type is higher than a sensitivity level of the first data type.

9. The system of claim 7, wherein the operations further comprise:
determining that the computing code causes the second data to be transmitted via the first API,
wherein the determining that the second data is to be masked is further based on the determining that the computing code causes the second data to be transmitted via the first API.

10. The system of claim 1, wherein the operations further comprise:
receiving an update to the computing code, wherein the update changes the first data to be transmitted via a second API;
determining that the first data is to be masked when sent through the second API based on the data classification rules; and
providing an alert to the user device that the computing code causes the first data to be transmitted via the second API with the update to the computing code.

11. The system of claim 1, wherein the operations further comprise:
receiving an update to the computing code, wherein the update changes the first data to a second data type used by the computing code;
determining that data having the second data type is to be masked when sent through the first API based on the data classification rules; and
providing an alert to the user device that the computing code causes the second data to be transmitted via the first API with the update to the computing code.

12. The system of claim 1, wherein the plurality of data types are associated with at least one of personally identifiable information, personal information, or financial information.

13. A method comprising:
receiving an update to computing code of a service provider system, wherein the update comprises updated computing code that causes personal information of users of the service provider system to be transmitted through an application programming interface (API) of the service provider system;
determining an information masking rule for masking of the personal information when transmitted through the API of the service provider system;
determining, from the information masking rule, that a portion of the personal information is designated for masking when transmitted through the API; and
masking the portion of the personal information when transmitted through the API.

14. The method of claim 13, further comprising:
displaying the masked portion of the personal information with the updated computing code via an interface of a software development kit (SDK) associated with the computing code.

15. The method of claim 13, wherein the masking the portion of the personal information comprises injecting an auto masking code as a wrapper to the portion of the personal information in the updated computing code.

16. The method of claim 13, wherein the portion of the personal information is transmitted using an API call transmitted by the API of the service provider system.

17. The method of claim 13, wherein the personal information comprises a plurality of portions of personal information used by the service provider system with end users of the service provider system.

18. The method of claim 17, wherein the plurality of portions of the personal information comprise at least one of a name, a social security number, an address, a date of birth, an age, a payment card, a bank account, a credit score, or a tax document.

19. A non-transitory machine-readable medium having stored thereon machine-readable instructions executable to cause a machine to perform operations comprising:

receiving a plurality of sensitivity levels for data having a plurality of personal information types when transmitted through an application programming interfaces (API) of a service provider system;

receiving a masking policy that designates whether to mask data having one of the plurality of sensitivity levels for the plurality of personal information types when transmitted through the API;

establishing the plurality of sensitivity levels and the masking policy with a software development kit (SDK) for code developers of the service provider system;

monitoring computing code changes via the SDK for the data having the plurality of personal information types transmitted via the API; and masking the data having the plurality of personal information types when transmitted via the API.

20. The non-transitory machine-readable medium of claim 19, wherein the plurality of sensitivity levels are designated by a data classification manager associated with the service provider system, and wherein the masking policy is designated by a configuration manager associated with the service provider system.

\* \* \* \* \*